United States Patent
Paczkowski et al.

(10) Patent No.: US 12,169,567 B2
(45) Date of Patent: *Dec. 17, 2024

(54) DATA COMMUNICATION SERVICE IN A TRUSTED EXECUTION ENVIRONMENT (TEE) AT THE NETWORK EDGE

(71) Applicant: T-MOBILE INNOVATIONS LLC, Overland Park, KS (US)

(72) Inventors: Lyle Walter Paczkowski, Mission Hills, KS (US); Ronald R. Marquardt, Woodinville, WA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 166 days.

This patent is subject to a terminal disclaimer.

(21) Appl. No.: 17/836,690

(22) Filed: Jun. 9, 2022

(65) Prior Publication Data

US 2022/0300614 A1 Sep. 22, 2022

Related U.S. Application Data

(63) Continuation of application No. 16/672,049, filed on Nov. 1, 2019, now Pat. No. 11,416,620.

(51) Int. Cl.
*G06F 21/57* (2013.01)
*H04L 9/06* (2006.01)
(Continued)

(52) U.S. Cl.
CPC .......... *G06F 21/575* (2013.01); *H04L 9/0643* (2013.01); *H04L 9/3236* (2013.01);
(Continued)

(58) Field of Classification Search
CPC ............. G06F 21/575; G06F 2221/034; H04L 9/0643; H04L 9/3236; H04L 9/3268; H04L 9/50
See application file for complete search history.

(56) References Cited

U.S. PATENT DOCUMENTS

| 5,596,718 A | 1/1997 | Boebert et al. |
| 7,313,692 B2 | 12/2007 | Weeks et al. |

(Continued)

FOREIGN PATENT DOCUMENTS

WO 2003107224 A1 12/2003

*Primary Examiner* — Aurel Prifti

(57) ABSTRACT

Provider Edge (PE) circuitry transfers a PE Hardware Trust (HWT) hash to a controller. The controller verifies PE HWT based on the PE HWT hash and transfers a Trusted Execution Environment Identifier (TEE ID), PE ID, PE HWT certificate, and PE keys to the PE circuitry. Customer Edge (CE) circuitry transfers a CE HWT hash to the controller. The controller verifies CE HWT based on the CE HWT hash and transfers the TEE ID, CE ID, CE HWT certificate, and CE keys to the CE circuitry. The PE circuitry and the CE circuitry exchange and verify their HWT certificates based on their keys. The PE circuitry encrypts and decrypts user data based on the PE keys. The PE circuitry exchanges the TEE ID, the PE ID, and the encrypted user data with the CE circuitry. The CE circuitry encrypts and decrypts the user data based on the CE keys. The CE circuitry exchanges the TEE ID, the CE ID, and the encrypted user data with the PE circuitry.

20 Claims, 10 Drawing Sheets

(51) Int. Cl.
   *H04L 9/32*       (2006.01)
   *H04L 9/00*       (2022.01)
(52) U.S. Cl.
   CPC ...... *H04L 9/3268* (2013.01); *G06F 2221/034* (2013.01); *H04L 9/50* (2022.05)

(56)           References Cited

U.S. PATENT DOCUMENTS

| | | |
|---|---|---|
| 8,279,864 B2 | 10/2012 | Wood |
| 8,316,435 B1 | 11/2012 | Varadhan et al. |
| 8,380,979 B2 | 2/2013 | Aaron et al. |
| 8,494,576 B1* | 7/2013 | Bye .......................... G07C 9/27 |
| | | 713/182 |
| 8,499,340 B2* | 7/2013 | Lindholm ............. H04L 61/301 |
| | | 709/200 |
| 8,532,095 B2* | 9/2013 | Mammoliti ......... H04L 41/0869 |
| | | 370/389 |
| 8,578,151 B2 | 11/2013 | Weeks et al. |
| 8,688,970 B2 | 4/2014 | Bachmann et al. |
| 8,902,766 B2 | 12/2014 | Kini et al. |
| 9,077,545 B2 | 7/2015 | Weeks et al. |
| 9,806,982 B2* | 10/2017 | Carney .................... H04L 45/02 |
| 9,929,964 B2 | 3/2018 | Saavedra |
| 9,967,745 B2 | 5/2018 | Marquardt et al. |
| 10,250,498 B1 | 4/2019 | Bales et al. |
| 10,938,855 B1* | 3/2021 | Waldie .................. G06F 21/575 |
| 11,108,637 B1* | 8/2021 | Paczkowski .......... H04W 76/11 |
| 2004/0024764 A1 | 2/2004 | Hsu et al. |
| 2010/0027549 A1* | 2/2010 | Satterlee ................. H04L 45/50 |
| | | 370/395.31 |
| 2014/0082352 A1 | 3/2014 | Howry et al. |
| 2014/0160918 A1 | 6/2014 | Veerappagowda et al. |
| 2016/0330249 A1* | 11/2016 | Bakker .................... H04L 69/22 |
| 2017/0230276 A1* | 8/2017 | Ceccarelli ............... H04L 45/64 |
| 2017/0230428 A1* | 8/2017 | Paczkowski ........ H04L 65/1016 |
| 2018/0287946 A1* | 10/2018 | Nagarajan ........... H04L 12/1877 |
| 2019/0132280 A1* | 5/2019 | Meuninck ............. H04L 69/321 |
| 2020/0235924 A1* | 7/2020 | Monica ................... H04L 63/14 |
| 2020/0265516 A1* | 8/2020 | Xu ............................. H04L 9/50 |
| 2020/0374104 A1* | 11/2020 | Heath ................. G06F 16/2365 |
| 2021/0042854 A1* | 2/2021 | Hazy ................. H04L 63/0421 |
| 2021/0044623 A1* | 2/2021 | Bosch ................ H04L 63/1416 |

* cited by examiner

US 12,169,567 B2

DATA COMMUNICATION SERVICE IN A TRUSTED EXECUTION ENVIRONMENT (TEE) AT THE NETWORK EDGE

RELATED CASES

This United States Patent Application is a continuation of U.S. patent application Ser. No. 16/672,049 that was filed on Nov. 1, 2019 and is entitled "DATA COMMUNICATION SERVICE IN A TRUSTED EXECUTION ENVIRONMENT (TEE) AT THE NETWORK EDGE." U.S. patent application Ser. No. 16/672,049 is hereby incorporated by reference into this United States Patent Applications.

TECHNICAL BACKGROUND

Data communication networks serve their users with data services like media conferencing, machine control, social networking, and content delivery. To support the data services, the data communication networks deploy packet routers in their own network facilities. The packet routers transfer data packets within the data communication network to deliver the data services. For large users like data centers, the data communication networks deploy packet routers across the network edge in the user's own facilities. These large users then connect various devices like application servers, storage drives, and user computers to their on-site packet routers which are integrated into the larger data communication network. For example, an application server in one data center may access data from a storage drive in another data center over the on-site and network packet routers.

Internet Protocol (IP) is a popular form of packet routing. Multi-Protocol Label Switching (MPLS) is a popular form of data networking that uses IP. MPLS devices wrap IP packets in MPLS wrappers that have routing labels. MPLS routers use the routing labels and the IP addresses to route the MPLS wrapped IP packets. MPLS routers at user facilities are called Customer Edge (CE) servers, and MPLS routers at network facilities are called Provider Edge (PE) servers. User devices are connected to the CE servers, and the CE servers are connected to the PE servers. The PE servers are interconnected to one another. A user may have several sites with CE servers and other user devices like application servers, storage drives, and user computers. The user devices communicate with one another over the on-site CE servers and the network PE servers.

Data communication networks face numerous security problems like malicious data theft and attacks. Various security mechanisms are used to secure data communication networks like access codes and encryption. Hardware-trust is a security mechanism that uses boot-level control and secret hardware codes. The boot-level control establishes a Trusted Execution Environment (TEE) by strictly controlling the software and data in the hardware from the start of hardware operation. The secret codes are used for hardware authentication by an authentication server that also has a copy of the secret codes. TEEs in different locations may use the authentication server to cross-validate hardware-trust and enhance TEE security. MPLS networks use hardware-trust to significantly improve their data and network security.

Distributed ledgers handle data transactions like account balances using a blockchain format. A single distributed ledger has multiple geographically-diverse computer nodes that each have their own copy of chain code and their own copy of data blocks. The computer nodes execute the chain code to test and build a consensus on the results of chain code execution. For example, multiple computer nodes each execute chain code to determine a user's new balance after a debit and then build a consensus on the new balance before proceeding. Once a consensus is reached, then the computer nodes each store a new data block in their own blockchain database. The new data block indicates the consensus chain code results. The new data block also has a hash of the previous data block. The node redundancy, consensus requirements, and hash chains make distributed ledgers highly reliable and secure.

Unfortunately, current data communication networks do not effectively and efficiently use hardware-trust at the network edge. Moreover, current MPLS networks do not effectively and efficiently use distributed ledgers to implement hardware-trust in their PE servers and CE servers.

TECHNICAL BACKGROUND

Provider Edge (PE) circuitry transfers a PE Hardware Trust (HWT) hash to a controller. The controller verifies PE HWT based on the PE HWT hash and transfers a Trusted Execution Environment Identifier (TEE ID), PE ID, PE HWT certificate, and PE keys to the PE circuitry. Customer Edge (CE) circuitry transfers a CE HWT hash to the controller. The controller verifies CE HWT based on the CE HWT hash and transfers the TEE ID, CE ID, CE HWT certificate, and CE keys to the CE circuitry. The PE circuitry and the CE circuitry exchange and verify their HWT certificates based on their keys. The PE circuitry encrypts and decrypts user data based on the PE keys. The PE circuitry exchanges the TEE ID, the PE ID, and the encrypted user data with the CE circuitry. The CE circuitry encrypts and decrypts the user data based on the CE keys. The CE circuitry exchanges the TEE ID, the CE ID, and the encrypted user data with the PE circuitry.

DETAILED DESCRIPTION

Figure 1:
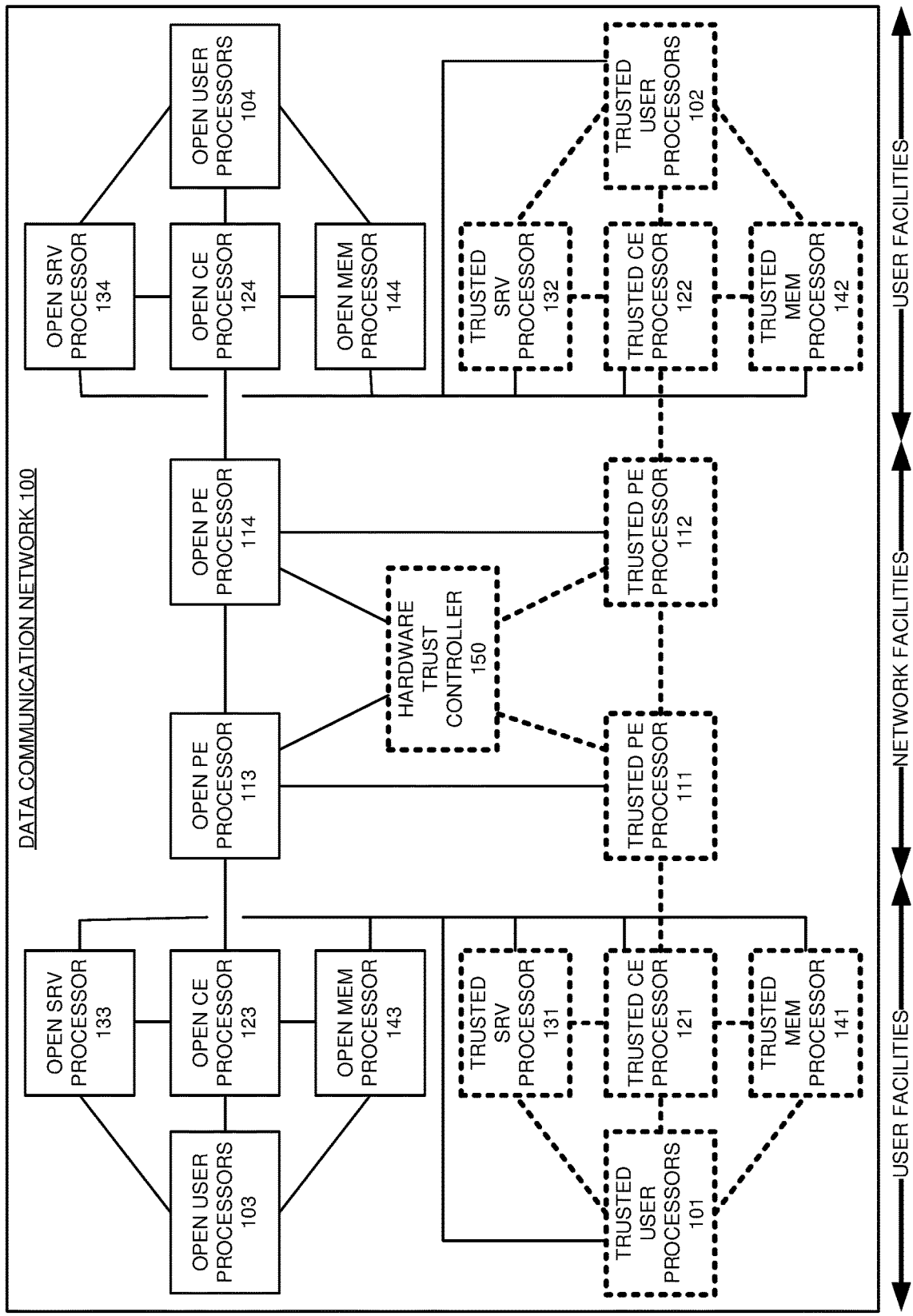
FIG. 1 illustrates a data communication network that exchanges trusted user data in a Trusted Execution Environment (TEE) at the network edge.

FIG. 1 illustrates data communication network 100 that exchanges trusted user data in a Trusted Execution Environment (TEE) at the network edge. The TEE comprises processors that require hardware authentication and network authorization before interacting with one another. Before interaction in the TEE, the processors first get their hardware identity authenticated and have their network access authorized. The processors in the TEE refuse to interact with other processors that cannot prove their hardware authentication and network authorization.

On FIG. 1, the TEE is indicated by heavy dotted lines that depict the hardware-trusted processors inside the TEE. The lighter solid lines depict open processors that are outside of the TEE. The open processors do not conform to the TEE but may still use some security measures. The arrows at the bottom of FIG. 1 indicate user facilities and network facilities. The points between the user facilities and the network facilities delineate the network edges. The TEE extends across the network edges from the network facilities into the user facilities. The TEE also interconnects the network edges on different ends of data communication network 100.

The TEE isolates different groups of users like the different customers of a data center. Along with hardware-trust, the TEE uses unique user IDs and uses unique encryption keys for each unique user ID. The TEE uniquely encrypts the user data for each user ID to isolate the different user groups. The trusted user data for a given user ID remains encrypted in the TEE unless needed by a trusted processor for routing, and some of the trusted data always remains encrypted in the TEE. In some examples, the TEE exchanges the trusted user data using Multi-Protocol Label Switching (MPLS) or Software-Defined Wide Area Network (SD-WAN). The TEE marks the MPLS or SD-WAN packets that transport the encrypted and trusted data with a TEE Identifier (ID) and user ID. The TEE ID and the user ID may be Inter-Planetary File System (IPFS) names.

Data communication network 100 comprises user processors 101-104, Provider Edge (PE) processors 111-114, Customer Edge (CE) processors 121-124, application server (SRV) processors 131-134, memory (MEM) processors 141-144, and hardware-trust controller 150. User processors 101-104 are linked to CE processors 121-124, server processors 131-134, and memory processors 141-144. CE processors 121-124 are linked to user processors 101-104, server processors 131-134, memory processors 141-144, and PE processors 111-114. PE processors 111-114 are linked to one another and to hardware-trust controller 150. The number of processors has been restricted for clarity on FIG. 1, and data communication network 100 typically has many additional processors.

Processors 101-104, 111-114, 121-124, 131-134, 141-144 comprise circuitry like Central Processing Units (CPUs), Graphical Processing Units (GPUs), Application-Specific Integrated Circuits (ASICs), Digital Signal Processors (DSPs), drive controllers, and/or the like. For example, memory processor 141 may be a controller in a flash drive, and CE processor 121 may be a CPU in a packet router. The processors execute software like operating systems, virtual components, network applications, and user applications. Trusted processors 101-102, 111-112, 121-122, 131-132, and 141-142 each have a unique read-only hardware-trust code. The hardware-trust codes are associated with TEE IDs and user IDs in hardware-trust controller 150.

Hardware-trust controller 150 comprises a computer system with processors, memory, transceivers, bus circuitry, and software. The software includes hardware drivers, operating systems, virtual components, and network applications. Hardware-trust controller 150 stores hardware-trust codes, TEE IDs, user IDs, and encryption keys for trusted processors 101-102, 111-112, 121-122, 131-132, and 141-142. Hardware-trust controller 150 validates the hardware-trust codes to authenticate the processors. Hardware-trust controller 150 identifies the TEE ID, user IDs, and encryption keys for the trusted processors to authorize network access.

Hardware-trust controller 150 encrypts and transfers the TEE ID, user IDs, and encryption keys to the trusted processors. Hardware-trust controller 150 does not expose the hardware-trust codes externally. Hardware-trust controller 150 does not expose the encryption keys beyond the trusted processors in the associated TEE ID and user ID that use the encryption keys. Hardware-trust controller 150 digitally signs hardware-trust certificates with a private key and transfers the hardware-trust certificates to the trusted processors. The trusted processors use a public key for hardware-trust controller 150 to decode and verify the digitally signed hardware-trust certificates. The hardware-trust certificates typically have a Time-To-Live (TTL) and must be refreshed—possibly on-demand.

In operation, trusted PE processors 111-112 power-up (boot) and responsively implement hardware-trust. Trusted PE processors 111-112 interact with hardware-trust controller 150 to obtain their hardware-trust certificates, TEE ID, user IDs, and encryption keys. Trusted PE processors 111-112 exchange and verify the hardware-trust certificates to establish the TEE. Trusted PE processors 111-112 may then encrypt and exchange trusted data within the TEE using the TEE ID, user IDs, and encryption keys.

Trusted PE processors 111-112 trigger the boot of open PE processors 113-114 and trusted CE processors 121-122. Trusted CE processors 121-122 boot and responsively implement hardware-trust. Trusted CE processors 121-122 trigger the boot of open CE processors 123-124. Trusted CE processors 121-122 interact with hardware-trust controller 150 over open processors 123-124 and 113-114 to obtain their hardware-trust certificates, TEE ID, user IDs, and encryption keys. Trusted PE processor 111 and trusted CE processor 121 exchange and verify their hardware-trust certificates to extend the TEE across the network edge. Trusted PE processor 112 and trusted CE processor 122 exchange and verify their hardware-trust certificates to extend the TEE across the other network edge. Trusted PE processors 111-112 and trusted CE processors 121-122 may then encrypt and exchange trusted data within the TEE using the TEE ID, user IDs, and encryption keys.

Trusted server processors 131-132 boot and responsively implement hardware-trust. Trusted sever processors 131-132 trigger the boot of open server processors 133-134. Trusted server processors 131-132 interact with hardware-trust controller 150 over open processors 133-134, 123-124, and 113-114 to obtain their hardware-trust certificates, TEE ID, user IDs, and encryption keys. Trusted server processor 131 and trusted CE processor 121 exchange and verify the hardware-trust certificates to extend the TEE to the application servers. Trusted server processor 132 and trusted CE processor 122 exchange and verify their hardware-trust certificates to extend the TEE to the application servers. Trusted server processors 131-132, trusted CE processors 121-122, and trusted PE processors 111-112 may then encrypt and exchange trusted data within the TEE using the TEE ID, user IDs, and encryption keys.

Trusted memory processors 141-142 boot and responsively implement hardware-trust. Trusted memory processors 141-142 trigger the boot of open memory processors 143-144. Trusted memory processors 141-142 interact with hardware-trust controller 150 over open processors 143-144, 123-124, and 113-114 to obtain their hardware-trust certificates, TEE ID, user IDs, and encryption keys. Trusted memory processor 141 and trusted CE processor 121 exchange and verify their hardware-trust certificates to extend the TEE to data storage. Trusted memory processor 142 and trusted CE processor 122 exchange and verify their hardware-trust certificates to extend the TEE to data storage. Trusted memory processors 141-142, trusted server processors 131-132, trusted CE processors 121-122, and trusted PE processors 111-112 may then encrypt and exchange trusted data within the TEE using the TEE ID, user IDs, and encryption keys.

Trusted user processors 101-102 implement hardware-trust. Trusted user processors 101-102 interact with hardware-trust controller 150 over open processors 123-124 and 113-114 to obtain their hardware-trust certificates, TEE ID, user IDs, and encryption keys. Trusted user processors 101 exchange and verify hardware-trust certificates with trusted CE processor 121, trusted server processor 131, and trusted memory processor 141 to extend the TEE to user devices (computers, robots, phones, data appliances, and the like). Trusted user processors 102 exchange and verify hardware-trust certificates with trusted CE processor 122, trusted server processor 132, and trusted memory processor 142 to extend the TEE to the user devices. Trusted user processors 101-102, trusted memory processors 141-142, trusted server processors 131-132, trusted CE processors 121-122, and trusted PE processors 111-112 may encrypt and exchange trusted data within the TEE using the TEE ID, user IDs, and encryption keys.

User devices that have user processors 101-104 may communicate over the open portion of data communication network 100. User devices that have user processors 101-104 may access open application servers, open data storage systems, and hardware-trust controller 150 using the open portion of data communication network 100.

The trusted user devices that have trusted processors 101-102 may communicate over the TEE portion of data communication network 100. The trusted user devices may access trusted application servers and trusted data storage systems in the TEE portion of data communication network 100. Advantageously, data communication network 100 extends the TEE from end-user to end-user across large geographic areas with secure access to data storage and application servers.

Within the TEE, fresh TEE IDs, user IDs, and encryption keys are distributed to the trusted processors periodically or on-demand. A processor that fails to use fresh hardware-trust certificates, TEE IDs, user IDs, and encryption keys is excluded from the TEE. For example, trusted CE processor 121 would not serve trusted memory processor 141 if memory processor 141 sends an invalid hardware-trust certificate or obsolete TEE ID.

New trusted processors may be added to the TEE by loading hardware-trust controller 150 with their hardware-trust codes, TEE ID, user IDs, and encryption keys. Old trusted processors may be removed by deleting their hardware-trust codes, TEE ID, user IDs, and encryption keys while also refreshing the TEE ID, user IDs, and encryption keys for the remaining trusted processors. In some examples, hardware-trust controller 150 comprises a distributed ledger that requires peer consensus for a new processor before admitting the new processor into the TEE.

The TEE IDs are unique within data communication network 100. In some examples, data communication network 100 is comprised of multiple sub-networks that have their own network domains. The TEE can readily span these different sub-network domains. In some examples, a distributed file system generates unique TEE IDs across the different sub-network domains. For example, an InterPlanetary File System (IPFS) may be used to generate the TEE IDs and user IDs.

Advantageously, data communication network 100 effectively and efficiently uses hardware-trust at the network edge.

Figure 2:
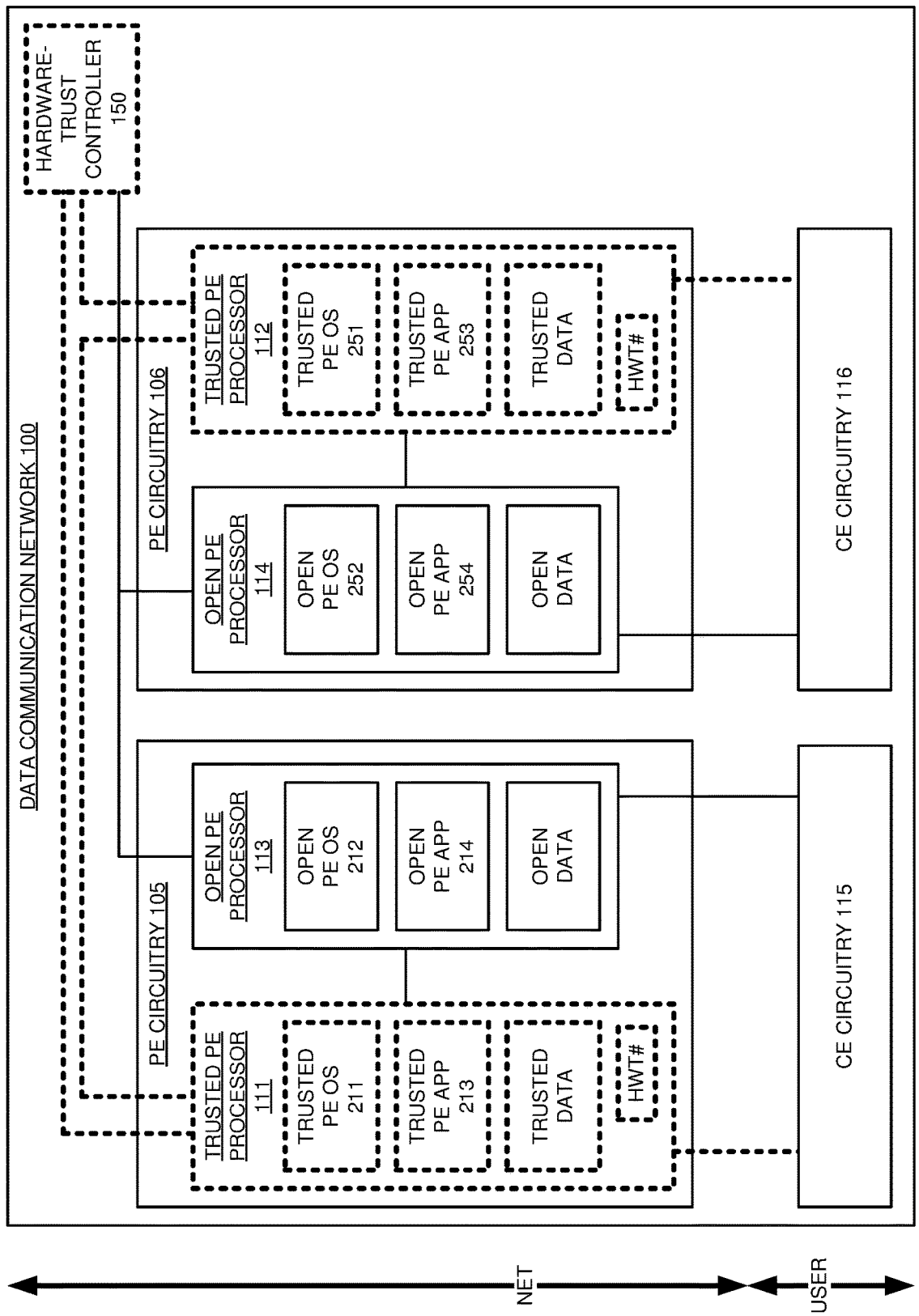
FIG. 2 illustrates Provider Edge (PE) circuitry that exchanges trusted user data in the TEE between different network edges.

FIG. 2 illustrates PE circuitry 105 and PE circuitry 106 that exchange trusted user data in the TEE between different network edges. PE circuitry 105-106 reside in network facilities. PE circuitry 105 comprises trusted PE processor 111 and open PE processor 113. Trusted PE processor 111 is linked to CE circuitry 115, open PE processor 113, trusted PE processor 112, and hardware-trust controller 150. Open PE processor 113 is linked to CE circuitry 115, trusted PE processor 111, open PE processor 114, and hardware-trust controller 150.

Open PE processor 113 comprises open PE OS 212, open PE application 214, and open data. Trusted PE processor 111 comprises trusted PE OS 211, trusted PE application 213, trusted data, and a secret hardware-trust code (HWT #). The hardware-trust code uniquely identifies trusted PE processor 111 and is physically embedded within in a read-only memory in processor 111. Trusted PE processor 111 executes trusted PE OS 211 and trusted PE application 213 in response to boot. Trusted PE application 213 is configured to hash the hardware-trust code of trusted PE processor 111, communicate with hardware-trust controller 150, exchange and validate hardware-trust certificates, and isolate/encrypt trusted user data based on TEE ID and user ID.

Initially, PE circuitry 105 boots trusted PE processor 111. Trusted PE processor 111 responsively executes trusted PE OS 211 and trusted PE application 213. Under the control of trusted PE application 213, PE circuitry 105 boots open PE processor 113 which responsively executes open PE OS 212 and open PE application 214. Open PE application 214 then exchanges open user data for linked processors. Trusted PE application 213 may direct PE circuitry 105 to stop open PE processor 113. Thus, trusted PE application 213 and processor 111 control the ability of open PE processor 113 to serve other processors.

PE circuitry 106 comprises trusted PE processor 112 and open PE processor 114. Trusted PE processor 112 is linked to CE circuitry 116, open PE processor 114, trusted PE processor 111, and hardware-trust controller 150. Open PE processor 114 is linked to CE circuitry 116, trusted PE processor 112, open CE processor 123, and hardware-trust controller 150.

Open PE processor 114 comprises open PE OS 252, open PE application 254, and open data. Trusted PE processor 112 comprises trusted PE OS 251, trusted PE application 252, trusted data, and a secret hardware-trust code. The hardware-trust code uniquely identifies trusted PE processor 112 and is physically embedded within in a read-only memory in processor 112. Trusted PE processor 112 executes trusted PE OS 251 and trusted PE application 213 in response to boot. Trusted PE application 213 is configured to hash the hardware-trust code of trusted PE processor 112, communicate with hardware-trust controller 150, exchange and validate hardware-trust certificates, and isolate/encrypt trusted user data based on TEE ID and user ID.

PE circuitry 106 boots trusted PE processor 112. Trusted PE processor 112 responsively executes trusted PE OS 251 and trusted PE application 253. Under the control of trusted PE application 253, PE circuitry 106 boots open PE processor 114 which responsively executes open PE OS 252 and open PE application 254. Open PE application 254 then exchanges open user data for linked processors. Trusted PE application 253 may direct PE circuitry 106 to stop open PE processor 114. Thus, trusted PE application 253 and processor 112 control the ability of open PE processor 114 to serve other processors.

Figure 3:
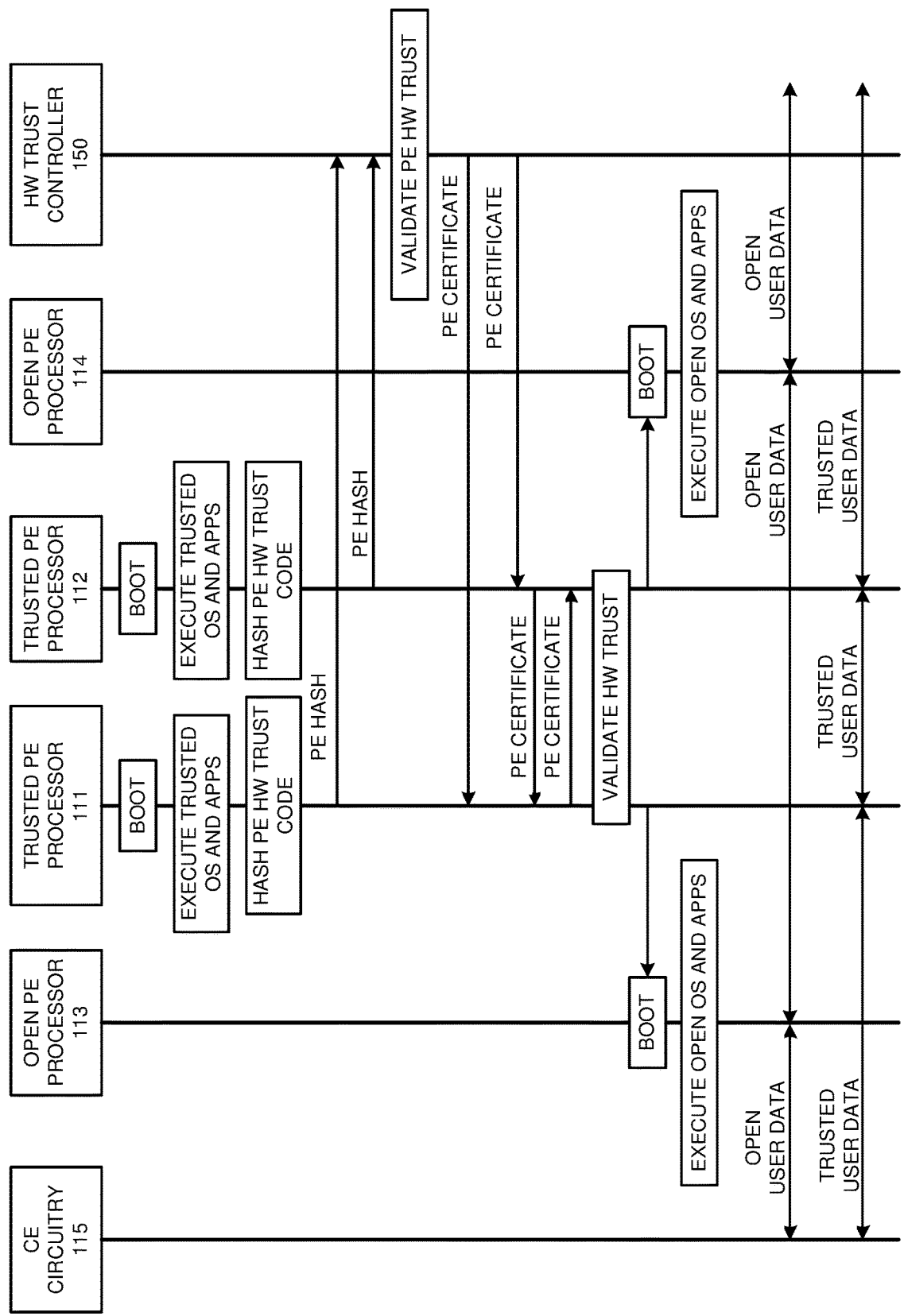
FIG. 3 illustrates the operation of the PE circuitry to exchange trusted user data in the TEE between different network edges.

FIG. 3 illustrates the operation of PE circuitry 105-106 to exchange trusted user data in the TEE between different network edges. Trusted PE processor 111 boots and executes trusted PE OS 211 and trusted PE application 213. Trusted PE processor 111 hashes its hardware-trust code with a random number. Trusted PE processor 111 transfers the hash and random number to hardware-trust controller 150. Hardware-trust controller 150 validates hardware-trust for trusted PE processor 111 and determines TEE ID, user IDs and encryption keys for trusted PE processor 111. Hardware-trust controller 150 signs a hardware-trust certificate with a private key. Hardware-trust controller 150 encrypts and transfers the hardware-trust certificate, TEE ID, user IDs and encryption keys to trusted PE processor 111.

Contemporaneously, trusted PE processor 112 boots and executes trusted PE OS 251 and trusted PE application 253. Trusted PE processor 112 hashes its hardware-trust code with a random number. Trusted PE processor 112 transfers the hash and random number to hardware-trust controller 150. Hardware-trust controller 150 validates hardware-trust for trusted PE processor 112 and determines TEE ID, user IDs and encryption keys for trusted PE processor 112. Hardware-trust controller 150 signs a hardware-trust certificate with a private key. Hardware-trust controller 150 encrypts and transfers the hardware-trust certificate, TEE ID, user IDs and encryption keys to trusted PE processor 112.

Trusted PE processor 111 and trusted PE processor 112 exchange their hardware-trust certificates. The exchange may occur over open PE processor 113 and open PE processor 114. Trusted PE processor 111 and trusted PE processor 112 validate the hardware-trust certificates by using the public key for hardware-trust controller 150 to decode and read the hardware-trust certificates.

Trusted PE processor 111 initiates the boot of open PE processor 113. Trusted PE processor 112 initiates the boot of open PE processor 114. CE circuitry 115 and open PE processor 113 exchange open user data. Open PE processor 113 and open PE processor 114 exchange open user data. Open PE processor 114 exchanges open user data with other systems like CE circuitry 116. CE circuitry 115 and trusted PE processor 111 encrypt and exchange trusted data. Trusted PE processor 111 and trusted PE processor 112 encrypt and exchange the trusted data. Trusted PE processor 112 encrypts and exchanges trusted data with other systems like CE circuitry 116. Trusted PE processors 111-112 isolate and encrypt the trusted user data using the specific encryption keys for the TEE ID and user IDs.

Figure 4:
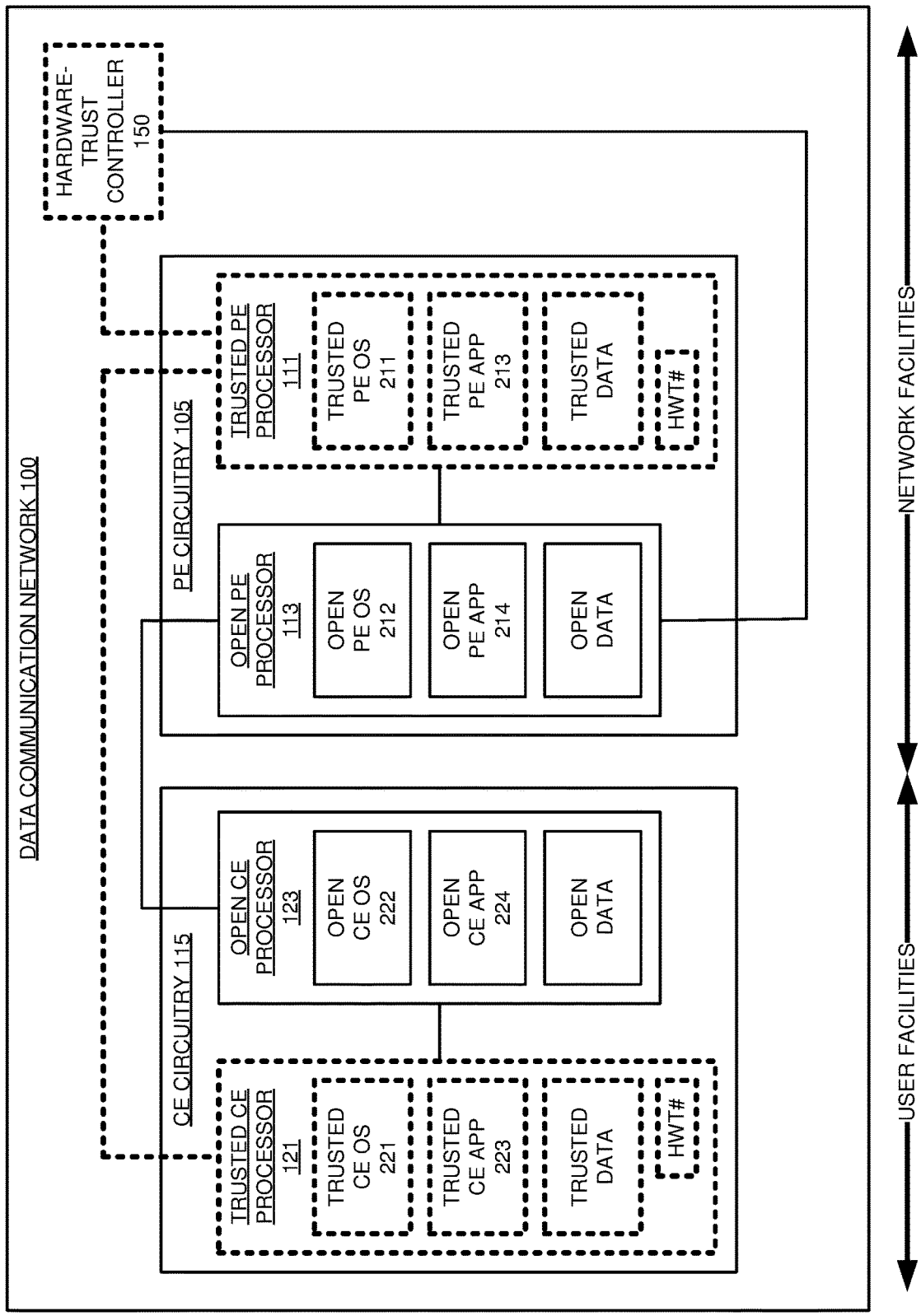
FIG. 4 illustrates Customer Edge (CE) circuitry and the PE circuitry that exchange trusted user data in the TEE at the network edge.

FIG. 4 illustrates PE circuitry 105 and CE circuitry 115 that exchange trusted user data in the TEE at the network edge of data communication network 100. CE circuitry 115 resides in user facilities and PE circuitry 105 resides across the edge in network facilities. CE circuitry 115 comprises trusted CE processor 121 and open CE processor 123. Trusted PE processor 111 is linked to open PE processor 113, trusted CE processor 121, and hardware-trust controller 150. Open PE processor 113 is linked to trusted PE processor 111, open CE processor 123, and hardware-trust controller 150. Trusted CE processor 121 is linked to open CE processor 123 and trusted PE processor 111. Open CE processor 123 is linked to trusted CE processor 121 and open PE processor 113.

CE circuitry 115 comprises trusted CE processor 121 and open CE processor 123. Open CE processor 123 comprises open CE OS 222, open CE application 224, and open data. Trusted CE processor 121 comprises trusted CE OS 221, trusted CE application 223, trusted data, and a secret hardware-trust code (HWT #). The hardware-trust code uniquely identifies trusted CE processor 121 and is physically embedded within in a read-only memory in processor 121. Trusted CE processor 121 executes trusted CE OS 221 and trusted CE application 223 in response to boot. Trusted CE application 223 is configured to hash the hardware-trust code of trusted CE processor 121, communicate with hardware-trust controller 150, exchange and validate hardware-trust certificates, and isolate/encrypt trusted user data per TEE IDs and user IDs.

CE circuitry 115 boots trusted CE processor 121. Trusted CE processor 121 responsively executes trusted CE OS 221 and trusted CE application 223. Under the control of trusted CE application 223, CE circuitry 115 boots open CE processor 123 which responsively executes open CE OS 222 and open CE application 224. Open CE application 224 may then exchange open user data for processors. Trusted CE application 223 may direct CE circuitry 115 to stop open CE processor 123. Thus, trusted CE application 223 and processor 121 control the ability of open CE processor 123 to serve other processors.

Figure 5:
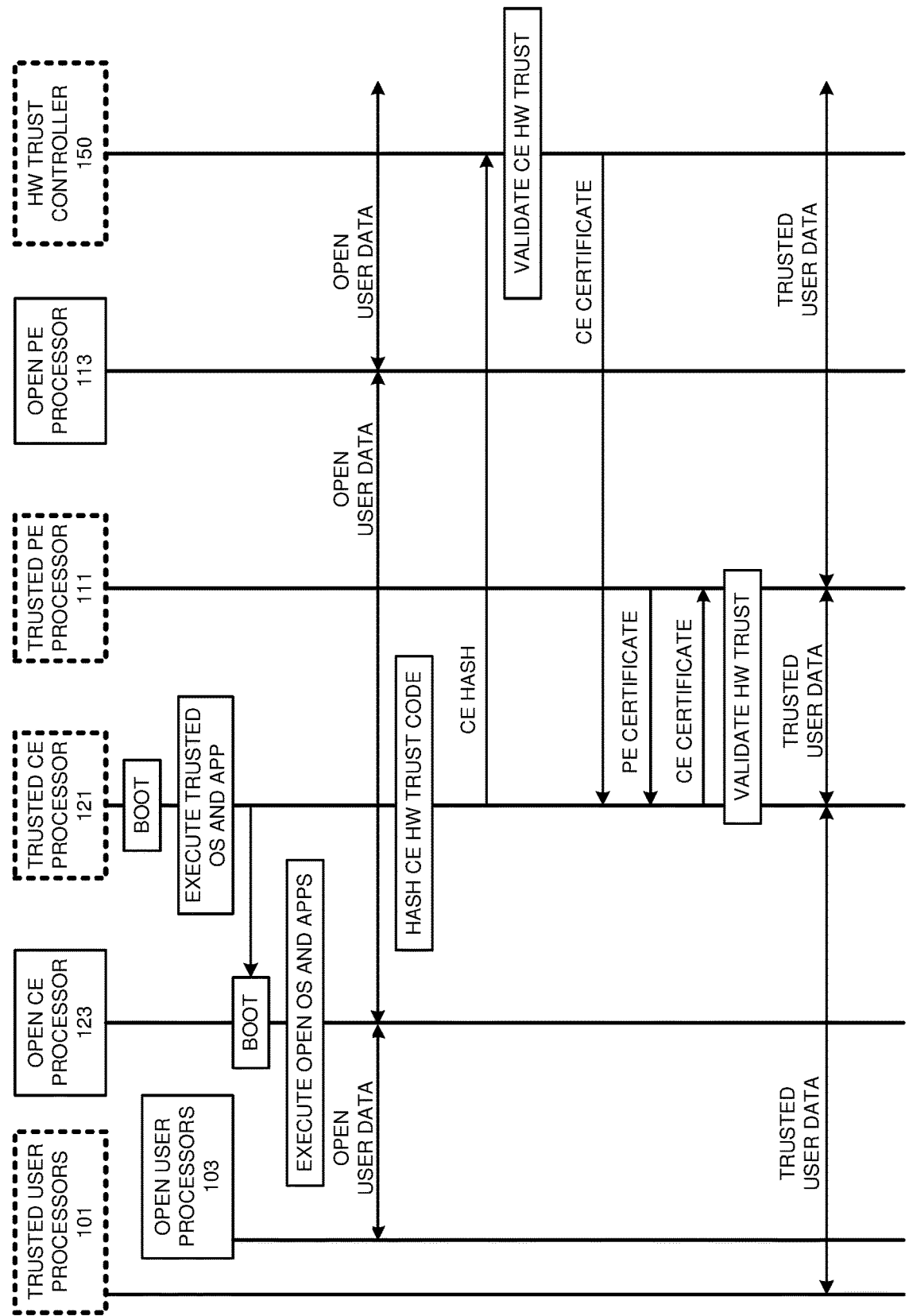
FIG. 5 illustrates the operation of the CE circuitry and PE circuitry to exchange trusted user data in the TEE at the network edge.

FIG. 5 illustrates the operation of PE circuitry 105 and CE circuitry 115 to exchange trusted user data in the TEE at the network edge. Trusted CE processor 121 boots and executes trusted CE OS 221 and trusted CE application 223. Under the control of trusted CE processor 121, open CE processor 123 boots and responsively executes open CE OS 222 and open PE application 224. Open user processors 103 and open CE processor 123 then exchange open user data. Open CE processor 123 and open PE processor 113 exchange open user data. Open PE processor 113 and other systems exchange open user data.

Trusted CE processor 121 hashes its hardware-trust code with a random number. Trusted CE processor 121 transfers the hash and random number to hardware-trust controller 150 over open CE processor 123 and open PE processor 113. Hardware-trust controller 150 validates hardware-trust and determines TEE ID, user IDs, and encryption keys for trusted CE processor 121. Hardware-trust controller 150 signs a hardware-trust certificate with its private key. Hardware-trust controller 150 encrypts and transfers the hardware-trust certificate, TEE ID, user IDs, and encryption keys to trusted CE processor 121.

Trusted PE processor 111 and trusted CE processor 121 exchange their hardware-trust certificates over open PE processor 113 and open CE processor 123. Trusted PE processor 111 and trusted CE processor 121 validate the hardware-trust certificates by using a public key for hardware-trust controller 150 to decode and read the hardware-trust certificates. Trusted user processors 101 and trusted CE processor 121 then exchange encrypted and trusted data. Trusted CE processor 121 and trusted PE processor 111 exchange encrypted and trusted data. Trusted PE processors 111 and CE processor 121 isolate/encrypt the trusted user data using the specific keys for the TEE ID and user IDs.

Figure 6:
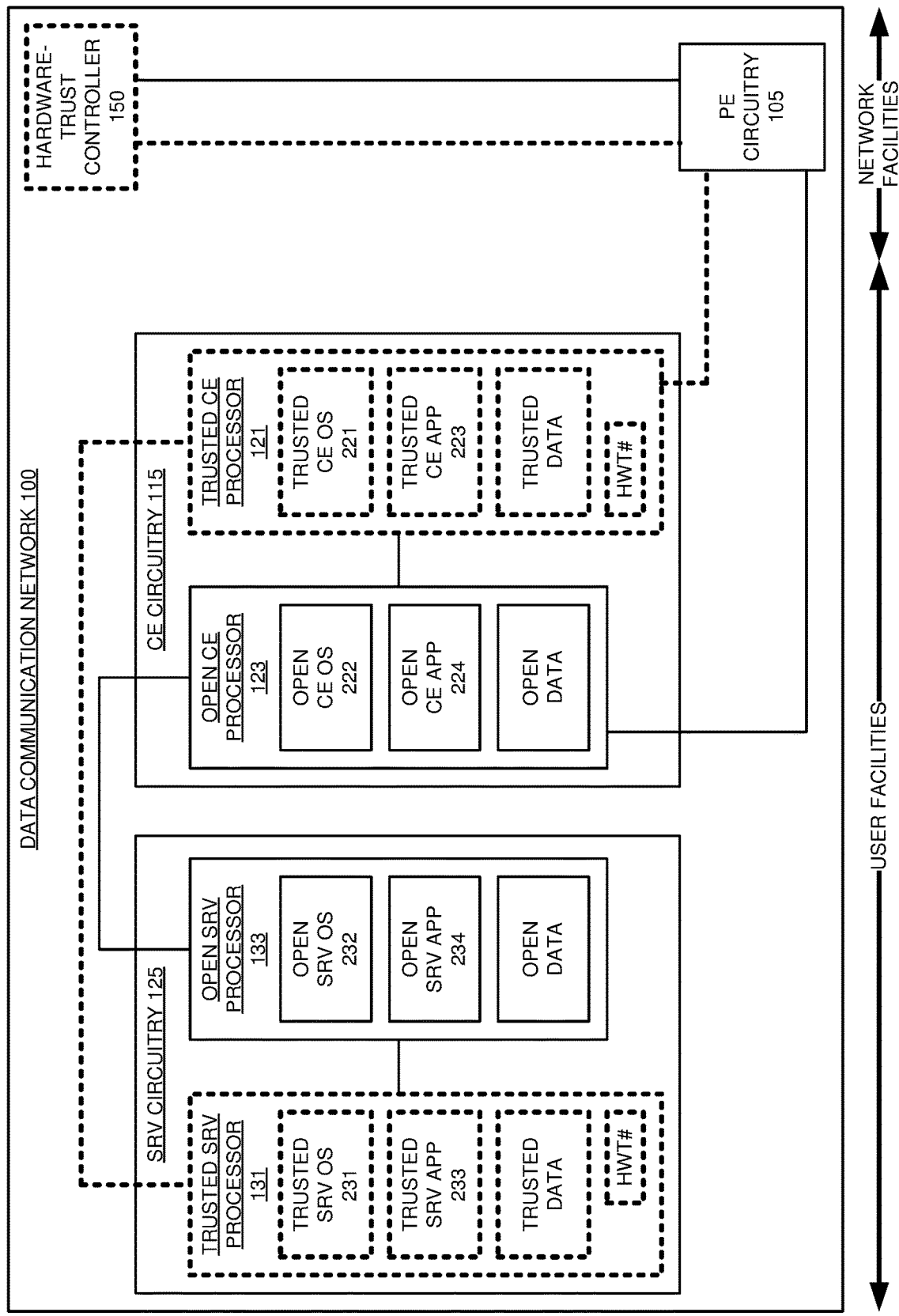
FIG. 6 illustrates application server (SRV) circuitry and the CE circuitry that exchange trusted user data in the TEE at the network edge.

FIG. 6 illustrates application server (SRV) circuitry 125 and CE circuitry 115 that exchange trusted user data in the TEE at the network edge. Server circuitry 125 and CE circuitry 115 reside in user facilities. Server circuitry 125 comprises trusted server processor 131 and open server processor 133. Trusted server processor 131 is linked to open server processor 133 and trusted CE processor 121. Open server processor 133 is linked to trusted server processor 131 and open CE processor 123. Trusted CE processor 121 is linked to open CE processor 123, trusted server processor 131, and PE circuitry 105. Open CE processor 123 is linked to trusted CE processor 121, open server processor 133, and PE circuitry 105.

Open server processor 133 comprises open server OS 232, open server application 234, and open data. Trusted server processor 131 comprises trusted server OS 231, trusted server application 233, trusted data, and a secret hardware-trust code (HWT #). The hardware-trust code uniquely identifies trusted server processor 131 and is physically embedded within in a read-only memory in processor 131. Trusted server processor 131 executes trusted server OS 231 and trusted server application 233 in response to boot. Trusted server application 233 is configured to hash the hardware-trust code of trusted server processor 131, communicate with hardware-trust controller 150, exchange and validate hardware-trust certificates, and encrypt trusted user data per TEE ID and user IDs.

Server circuitry 125 boots trusted server processor 131. Trusted server processor 131 responsively executes trusted server OS 231 and trusted server application 233. Under the control of trusted server application 233, server circuitry 125 boots open server processor 133 which responsively executes open server OS 232 and open server application 234. Open CE application 224 and open server application 234 may then exchange open user data for processors. Trusted server application 233 may direct server circuitry 125 to stop open server processor 133. Thus, trusted server application 233 and processor 131 control the ability of open server processor 133 to serve other processors.

Figure 7:
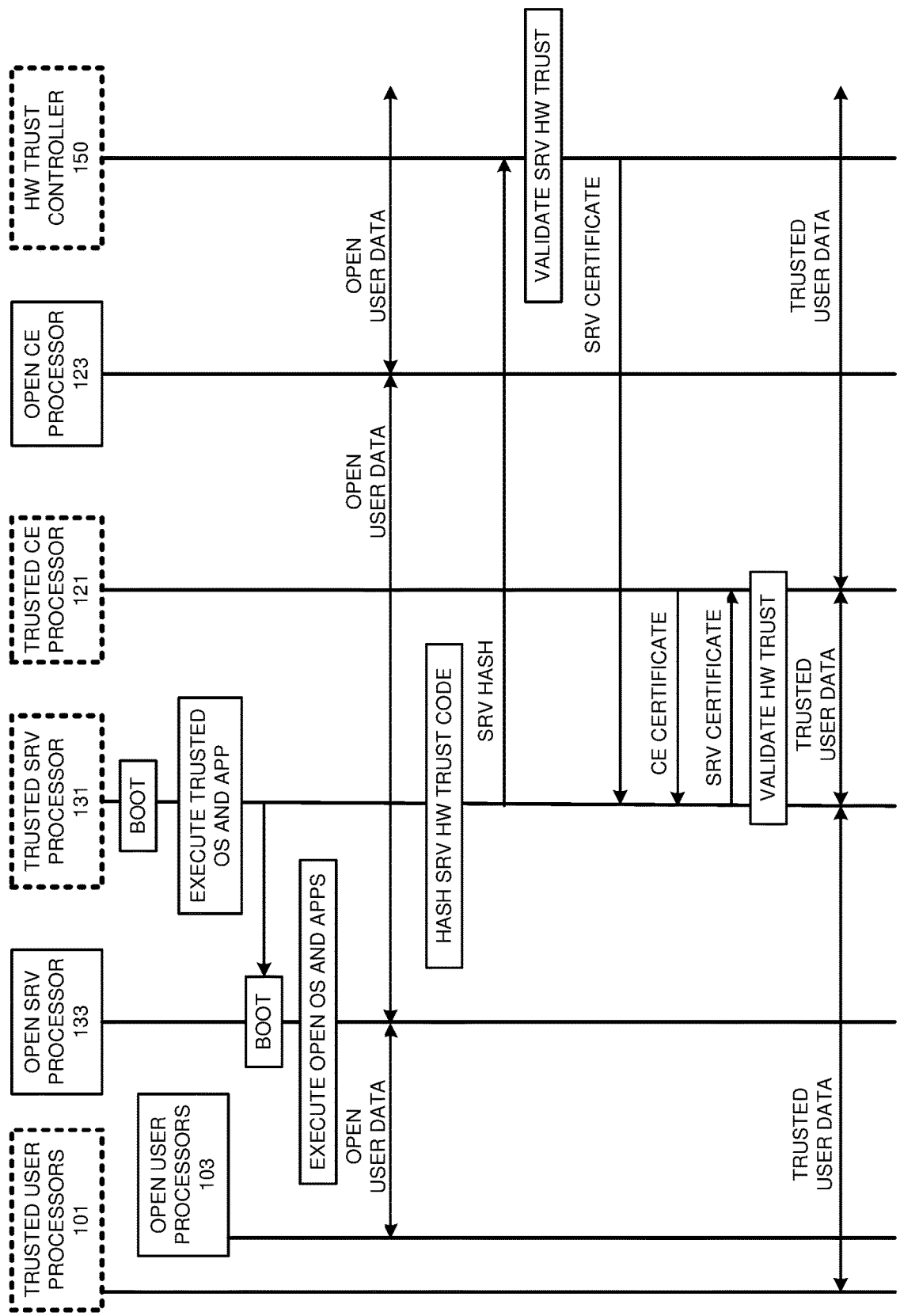
FIG. 7 illustrates the operation of the application server circuitry and the CE circuitry to exchange trusted user data in the TEE at the network edge.

FIG. 7 illustrates the operation of application server circuitry 125 and CE circuitry 115 to exchange trusted user data in the TEE at the network edge. Trusted server processor 131 boots and executes trusted server OS 231 and trusted server application 233. Under the control of trusted server processor 131, open server processor 133 boots and executes open server OS 232 and open server application 234. Open user processors 103 and open server processor 133 then exchange open user data. Open server processor 133 and open CE processor 123 exchange open user data. Open CE processor 123 and other systems like PE circuitry 105 exchange open user data.

Trusted server processor 131 hashes its hardware-trust code with a random number. Trusted server processor 131 transfers the hash and random number to hardware-trust controller 150 over open CE processor 123 and open PE processor 113. Hardware-trust controller 150 hashes its copy of the hardware-trust code for trusted server processor 131 with the random number to match results and validate hardware-trust for trusted server processor 131 Hardware-trust controller 150 identifies TEE ID, user IDs, and encryption keys for trusted server processor 131. Hardware-trust controller 150 signs a hardware-trust certificate for trusted server processor 131 with a private key. Hardware-trust controller 150 transfers the digitally-signed hardware-trust certificate, TEE ID, user IDs, and encryption keys to trusted server processor 131.

Trusted CE processor 121 and trusted server processor 131 exchange their hardware-trust certificates over open CE processor 123 and open sever processor 133. Trusted CE processor 121 and trusted server processor 131 validate the hardware-trust certificates by using a public key for hardware-trust controller 150 to decode and read the hardware-trust certificates. Trusted server processor 131 and trusted user processors 101 may also exchange and validate their hardware-trust certificates over open CE processor 123. Trusted user processors 101 and trusted server processor 131 then exchange encrypted and trusted data. Trusted server processor 131 and trusted CE processor 121 exchange encrypted and trusted data. Trusted server processor 131 and CE processor 121 isolate/encrypt the trusted user data using the specific keys for the TEE ID and user IDs.

Figure 8:
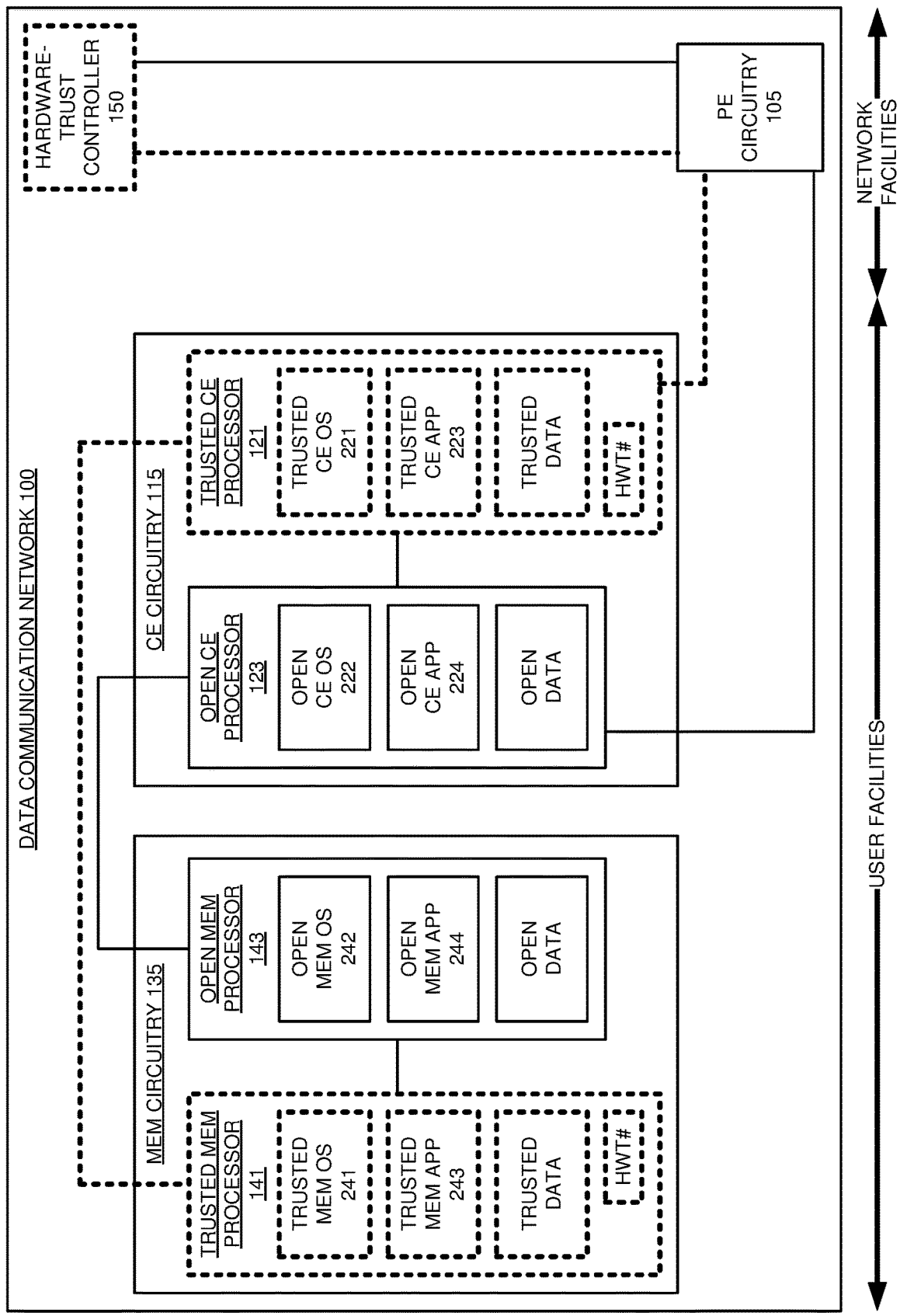
FIG. 8 illustrates memory (MEM) circuitry and the CE circuitry that exchange trusted user data in the TEE at the network edge.

FIG. 8 illustrates memory (MEM) circuitry 135 and CE circuitry 115 that exchange trusted user data in the TEE at the network edge. Memory circuitry 135 and CE circuitry 125 reside in user facilities. Memory circuitry 135 comprises trusted memory processor 141 and open memory processor 143. Trusted memory processor 141 is linked to open memory processor 143 and trusted CE processor 121. Open memory processor 143 is linked to trusted memory processor 141 and open CE processor 123. Trusted CE processor 121 is linked to open CE processor 123, trusted memory processor 141, and PE circuitry 105. Open CE processor 123 is linked to trusted CE processor 121, open memory processor 143, and PE circuitry 105.

Open memory processor 143 comprises open memory OS 242, open memory application 244, and open data. Trusted memory processor 141 comprises trusted memory OS 241, trusted memory application 243, trusted data, and a secret hardware-trust code (HWT #). The hardware-trust code uniquely identifies trusted memory processor 141 and is physically embedded within in a read-only memory in processor 141. Trusted memory processor 141 executes trusted memory OS 241 and trusted memory application 243 in response to boot. Trusted memory application 243 is configured to hash the hardware-trust code of trusted memory processor 141, communicate with hardware-trust controller 150, exchange and validate hardware-trust certificates, and isolate/encrypt trusted user data per TEE ID and user IDs.

Memory circuitry 135 boots trusted memory processor 141. Trusted memory processor 141 responsively executes trusted memory OS 241 and trusted memory application 243. Under the control of trusted memory application 243, server circuitry 135 boots open memory processor 143 which responsively executes open memory OS 242 and open memory application 244. Open CE application 224 and open memory application 244 may then exchange open user data for processors. Trusted memory application 243 may direct memory circuitry 135 to stop open memory processor 143. Thus, trusted memory application 243 and processor 141 control the ability of open memory processor 143 to serve other processors.

Figure 9:
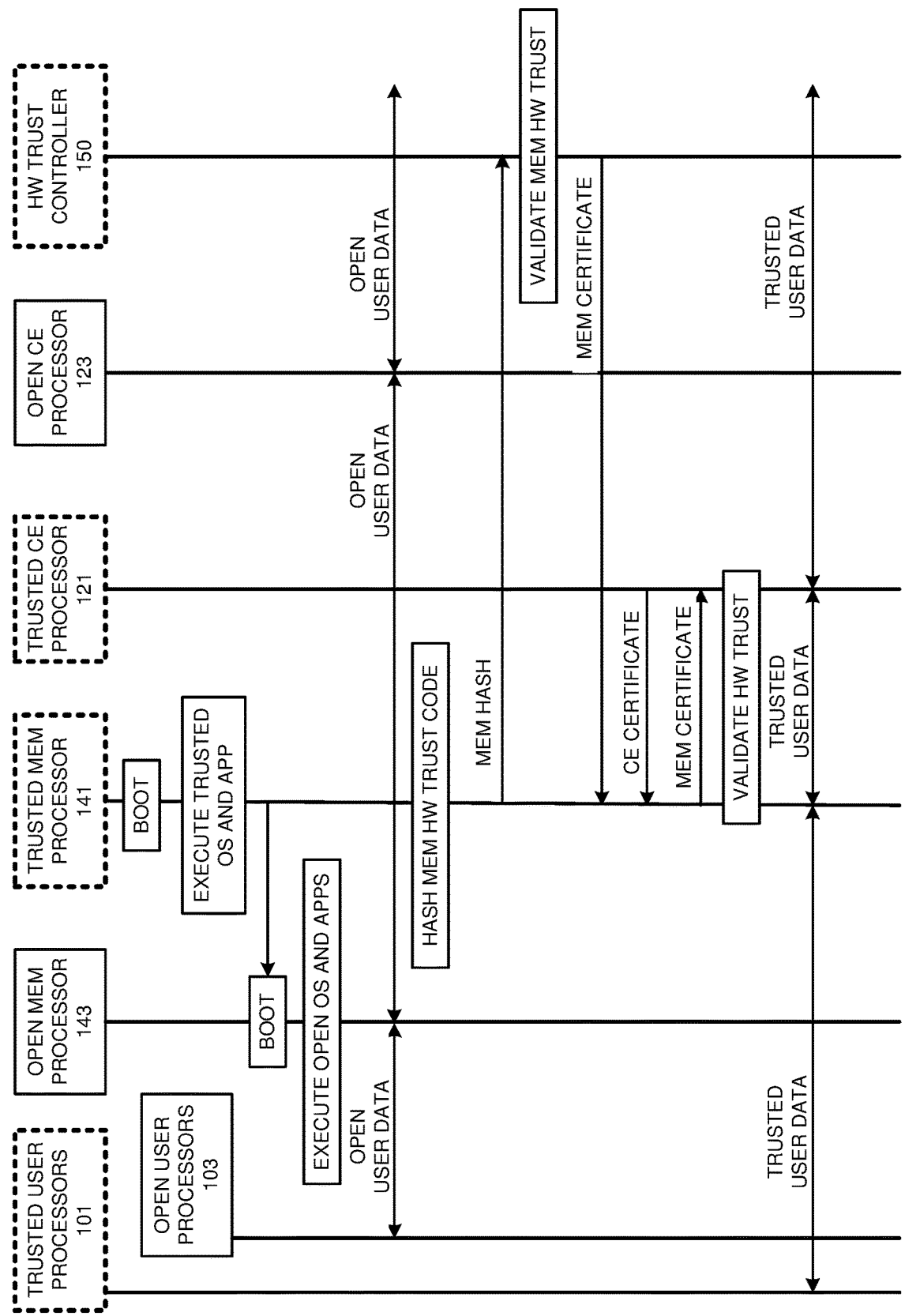
FIG. 9 illustrates the operation of the memory circuitry and the CE circuitry to exchange trusted user data in the TEE at the network edge.

FIG. 9 illustrates the operation of memory circuitry 135 and CE circuitry 115 to exchange trusted user data in the TEE at the network edge. Trusted memory processor 141 boots and executes trusted memory OS 241 and trusted memory application 243. Under the control of trusted memory processor 141, open memory processor 143 boots and executes open memory OS 242 and open memory application 244. Open user processors 103 and open memory processor 143 then exchange open user data. Open memory processor 143 and open CE processor 123 exchange open user data. Open CE processor 123 and other systems like PE circuitry 105 exchange open user data.

Trusted memory processor 141 hashes its hardware-trust code with a random number. Trusted memory processor 141 transfers the hash and random number to hardware-trust controller 150 over open CE processor 123 and open PE processor 113. Hardware-trust controller 150 hashes its copy of the hardware-trust code for trusted memory processor 141 with the random number to match results and validate hardware-trust for trusted memory processor 141 Hardware-trust controller 150 identifies TEE ID, user IDs, and encryption keys for trusted memory processor 141. Hardware-trust controller 150 signs a hardware-trust certificate for trusted memory processor 141 with a private key. Hardware-trust controller 150 transfers the digitally-signed hardware-trust certificate, TEE ID, user IDs, and encryption keys to trusted memory processor 141.

Trusted CE processor 121 and trusted memory processor 141 exchange their hardware-trust certificates over open CE processor 123 and open memory processor 143. Trusted CE processor 121 and trusted memory processor 141 validate the hardware-trust certificates by using a public key for hardware-trust controller 150 to decode and read the hardware-trust certificates. Trusted memory processor 141 and trusted user processors 101 may also exchange and validate their hardware-trust certificates over open CE processor 123. Trusted user processors 101 and trusted memory processor 141 then exchange encrypted and trusted data. Trusted memory processor 141 and trusted CE processor 121 exchange encrypted and trusted data. Trusted memory processor 141 and CE processor 121 isolate/encrypt the trusted user data using the specific keys for the TEE ID and user IDs.

Figure 10:
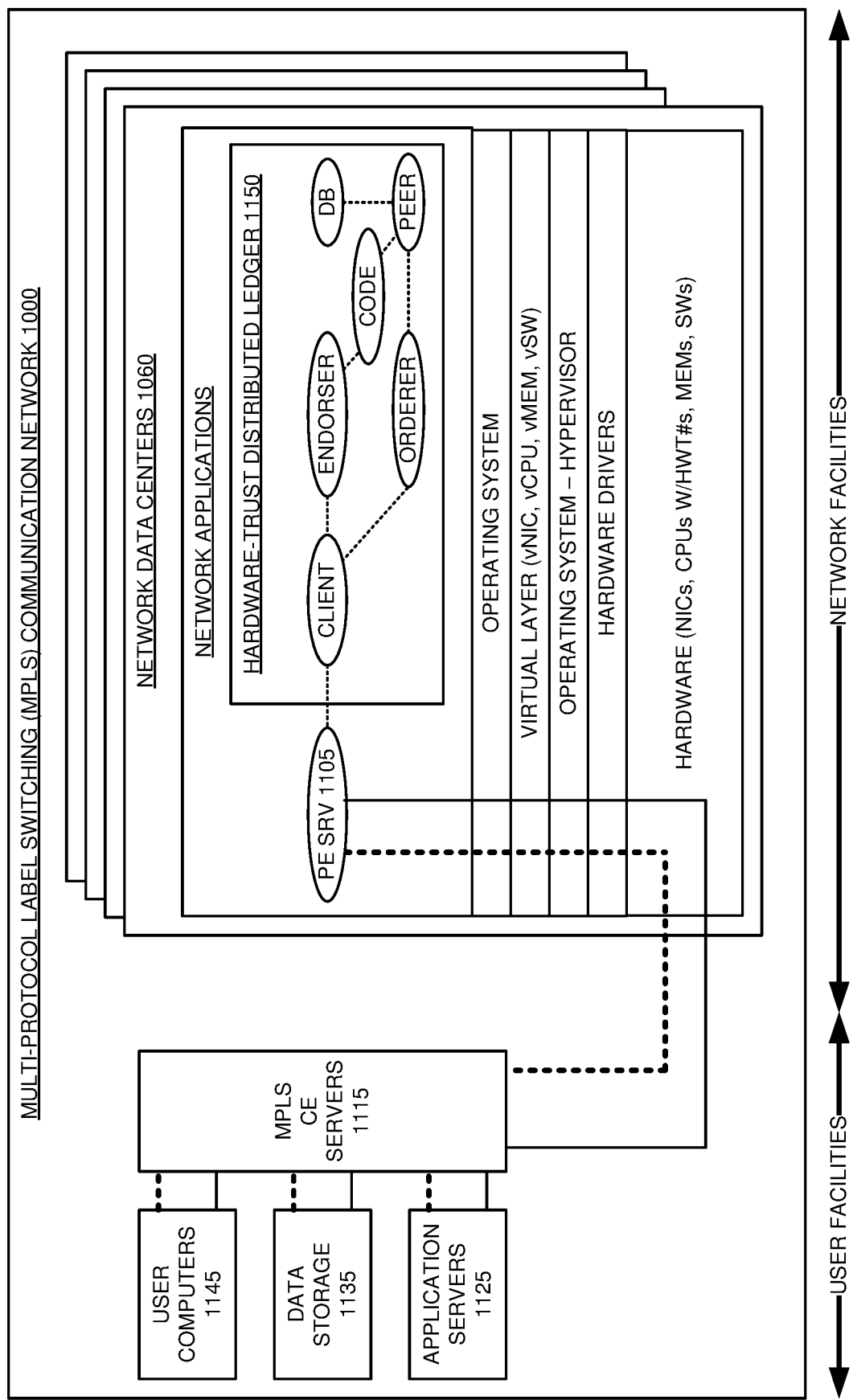
FIG. 10 illustrates a data communication network comprising a hardware-trust distributed ledger to support the exchange of trusted user data in a TEE at network edges.

FIG. 10 illustrates Multi-Protocol Label Switching (MPLS) communication network 1000 comprising a hardware-trust distributed ledger 1150 to support the exchange of trusted user data in a TEE at the MPLS network edge. MPLS communication network 1000 is an example of data communication network 100, although network 100 may differ. In the user facilities, MPLS communication network 1000 comprises MPLS Customer Edge (CE) servers 1101, application servers 1125, data storage 1135, and user computers 1145. In the network facilities, MPLS communication network 1000 comprises network data centers 1060.

Network data centers 1060 comprise multiple geographically diverse computer systems that each comprise hardware, hardware drivers, operating systems/hypervisors, virtual layers, and network applications. The network applications include Provider Edge (PE) servers (including PE server 1105) and hardware-trust distributed ledger 1150. Data centers 1060 may comprise Network Function Virtualization Infrastructures (NFVIs), and the network applications may comprise Virtual Network Functions (VNFs). The data center hardware comprises Network Interface Cards (NICs), CPUs, RAM, disk storage, and data switches (SWS). The CPUs each have a unique hardware-trust code (HWT #). The virtual layers comprise virtual NICs (vNIC), virtual CPUs (vCPU), virtual memory (vMEM), and virtual Switches (vSW). The NICs of data centers 1060 are linked to each other and to MPLS CE servers 1115. For clarity, the links between individual data centers 1060 are not shown on FIG. 10. Hardware-trust distributed ledger 1150 comprises clients, endorser nodes, orderer nodes, peer nodes, chain code, and blockchain databases. The chain code has hardware-trust hash algorithms, and the databases store hardware-trust codes, TEE IDs, user IDs, encryption keys, and hardware-trust transaction data.

In operation, PE server 1105 boots and responsively implements hardware-trust. PE server 1105 hashes the hardware-trust code in its CPU and transfers the hash and random number to the ledger client. The ledger client transfers the proposed transaction (hardware-trust authentication and network authorization) to one or more endorser nodes. The endorser nodes execute their chain code to hash the hardware trust code for PE server 1105. The endorser nodes match their own result with the received hash from PE server 1105 to authenticate PE server 1105. The endorser nodes retrieve TEE ID, user IDs, and encryption keys from the database to authorize network service for PE server 1105. The endorser nodes generate a hardware-trust certificate for PE server 1105. The endorser nodes compare their chain code result (trust certificate, TEE ID, user IDs, and encryption keys) to an endorser rule set, and if the chain code result passes the endorsement rules, then the endorser nodes transfer a transaction endorsement back to the ledger client.

The ledger client then transfers the endorsed transaction (hardware-trust authentication and network authorization) to one or more orderer nodes. The orderer nodes transfer the endorsed transaction to the peer nodes. The peer nodes execute their chain code to hash the hardware trust code for PE server 1105. The peer nodes match their hash result with the hash result from PE server 1105 to authenticate PE server 1105. The peer nodes retrieve TEE ID, user IDs, and encryption keys for the hardware trust code from the database to authorize PE server 1105. The peer nodes generate a hardware-trust certificate for PE server 1105. The peer nodes share their chain code results (trust certificate, TEE ID, user IDs, and encryption keys) to form a consensus on the result. If a consensus is formed, then the peer nodes record the transaction in their databases in the blockchain format. In the blockchain format, a new data block stores new data for a current transaction, and the new block also stores a hash of the previous data block for the previous transaction. The block hashes chain the data blocks together in a time sequence.

One or more peer nodes transfer the chain code results (hardware trust certificate, TEE ID, user IDs, and encryption keys) to the ledger client. The ledger client transfers the chain results to PE server 1105. PE server 1105 shares the hardware trust certificate with other trusted devices to form a TEE. PE server 1105 encrypts user data using the encryption keys per the user IDs. PE server 1105 wraps the encrypted user data in an MPLS wrapper that has the TEE ID and user ID. Only other devices that use the same TEE ID and user ID have the keys to decrypt and process the MPLS wrapper. The other PE servers in data centers 1060 also establish hardware trust, encrypt trusted data using keys for the TEE ID and user ID, and route the encrypted and trusted data per the MPLS labels and corresponding network addresses.

In a like manner, CE servers 1115 boot and responsively implement hardware-trust. CE servers 1115 hash their hardware-trust codes and transfer the hashes to the ledger clients in network data centers 1060. The ledger clients transfer the proposed transactions (hardware-trust authentication and network authorization) to the endorser nodes. The endorser nodes execute the chain code to hash the hardware trust codes for CE servers 1105. The endorser nodes match the results with the hashes from CE servers 1115 to individually authenticate CE servers 1115. The endorser nodes retrieve TEE IDs, user IDs, and encryption keys from the database.

The endorser nodes generate hardware-trust certificates for CE servers 1105. The endorser nodes compare their chain code result (trust certificates, TEE IDs, user IDs, and encryption keys) to an endorser rule set, and if the chain code result passes the endorsement rules, then the endorser nodes transfer a transaction endorsement back to the client.

The client then transfers the endorsed transaction (hardware-trust authentication and network authorization) to one or more orderer nodes. The orderer nodes transfer the endorsed transaction to the peer nodes. The peer nodes execute the chain code to hash the hardware trust codes for CE servers 1115. The peer nodes match their results with the hashes from CE servers 1115 to authenticate CE servers 1115. The peer nodes retrieve TEE IDs, user IDs, and encryption keys for the hardware trust codes from the database. The peer nodes generate hardware-trust certificates for CE servers 1115. The peer nodes share their chain code results (trust certificates, TEE ID, user IDs, and encryption keys) to form an individual consensus on the individual results. When consensus is formed for a given transaction, the peer nodes record the transaction in the database in the blockchain format and transfer the chain code results to the client. The client transfers the chain results to CE servers 1115. CE servers 1115 share their hardware trust certificates with other devices in the TEE like PE server 1105. CE servers 1115 encrypt user data using the specific encryption keys for the TEE ID and user ID. CE servers 1115 wrap the encrypted user data in MPLS wrappers that have the TEE ID appropriate user ID. Only devices that use the same TEE ID and user ID have the proper keys to decrypt and process the MPLS wrapper.

Application servers 1125, data storage 1135, and user computers 1145 each perform the above hardware-trust procedure to obtain their hardware-trust certificates, TEE IDs, user IDs, and encryption keys. Application servers 1125, data storage 1135, and user computers 1145 each share and verify hardware-trust certificates. Application servers 1125, data storage 1135, and user computers 1145 each use their TEE ID, user IDs, and encryption keys to exchange trusted data in MPLS wrappers.

For example, a trusted user computer in a first user site may use their hardware-trust certificate to retrieve trusted financial data from a trusted company database in a second user site and process the trusted financial data in trusted application servers in a third user site to generate a secret financial presentation. The trusted user computer may then encrypt and transfer the secret financial presentation to another trusted user computer in a fourth user site. During these operations, the secret financial presentation remains encrypted when outside of the trusted user computers and application servers. The trusted CE servers and PE servers only decrypt the MPLS wrapper using the keys for the TEE ID and user ID to obtain the MPLS routing label and network addressing.

Within the TEE, fresh hardware-trust certificates, TEE IDs, user IDs, and encryption keys can be distributed to the trusted devices periodically or on-demand. A device that fails to use fresh hardware-trust certificates, TEE IDs, user IDs, and encryption keys is excluded from the TEE. For example, trusted PE server 1105 would not serve one of trusted CE servers 1115 that failed to provide a hardware-trust certificate or that used an obsolete user ID.

New trusted devices may be added by loading the databases in hardware-trust distributed ledger 1150 with the appropriate hardware-trust codes, TEE ID, user IDs, and encryption keys. Old trusted devices may be removed by deleting their hardware-trust codes, TEE ID, user IDs, and encryption keys from the databases and refreshing the TEE ID, user IDs, and encryption keys for the remaining trusted devices.

In some examples, at least some of the peer nodes are configured to obtain human consent before joining a consensus when adding a new device and/or user ID to the TEE. For example, the peer nodes may require human consent from personnel that currently use the TEE before admitting a new device or user ID to the TEE. Unanimous consent from all peers may be required. The peer nodes can implement various access rules based on their chain code, databases, and consent requirements.

The TEE IDs are unique within data communication network 1000. In some examples, data communication network 1000 is comprised of multiple sub-networks that have their own IP addressing and MPLS labeling domains. The TEE can readily span these different sub-networks. In some examples, the unique TEE IDs are generated using a distributed file system like InterPlanetary File System (IPFS). In some examples, unique user IDs are generated using a distributed file system.

Advantageously, MPLS communication network 1000 effectively and efficiently uses distributed ledger 1150 to implement hardware-trust in PE server 1105, CE servers 1115, application servers 1125, data storage 1135, user computers 1145, and other MPLS devices.

Alternatively, SD-WAN could be used in a like manner instead of MPLS.

The wireless data network circuitry described above comprises computer hardware and software that form special-purpose network circuitry to support a TEE at the network edge. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to support a TEE at the network edge.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a data communication network to exchange user data across a provider edge and a customer edge based on hardware-trust, the method comprising:

provider edge circuitry hashing a provider edge hardware-trust code and transferring the provider edge hardware-trust code hash to a hardware-trust controller;

the hardware-trust controller receiving the provider edge hardware-trust code hash from the provider edge circuitry, verifying provider edge hardware-trust based on the provider edge hardware-trust code hash, and in response to the provider edge hardware-trust verification, transferring a trusted execution environment Identifier (ID), provider edge ID, provider edge hardware-trust certificate, and provider edge keys to the provider edge circuitry;

customer edge circuitry hashing a customer edge hardware-trust code and transferring the customer edge hardware-trust code hash to the hardware-trust controller;

the hardware-trust controller receiving the customer edge hardware-trust code hash from the customer edge circuitry, verifying customer edge hardware-trust based on the customer edge hardware-trust code hash, and in response to the customer edge hardware-trust verification, transferring the trusted execution environment ID, a customer edge ID, customer edge hardware-trust certificate, and customer edge keys to the customer edge circuitry;

the provider edge circuitry transferring the provider edge hardware-trust certificate to the customer edge circuitry, receiving the customer edge hardware-trust certificate from the customer edge circuitry, and verifying the customer edge hardware-trust based on the customer edge hardware-trust certificate and the provider edge keys;

the customer edge circuitry transferring the customer edge hardware-trust certificate to the provider edge circuitry, receiving the provider edge hardware-trust certificate from the provider edge circuitry, and verifying the provider edge hardware-trust based on the provider edge hardware-trust certificate and the customer edge keys;

in response to the customer edge hardware-trust verification, the provider edge circuitry encrypting and decrypting user data based on the provider edge keys and exchanging the trusted execution environment ID, the provider edge ID, and the encrypted user data with the customer edge circuitry; and in response to the provider edge hardware-trust verification, the customer edge circuitry encrypting and decrypting the user data based on the customer edge keys and exchanging the trusted execution environment ID, the customer edge ID, and the encrypted user data with the provider edge circuitry.

2. The method of claim 1 further comprising:

the provider edge circuitry isolating the user data in the trusted execution environment from other user data in other trusted execution environments;

the customer edge circuitry isolating the user data in the trusted execution environment from the other user data in the other trusted execution environments; and the customer edge circuitry exchanging at least some of the user data with user processors in the trusted execution environment.

3. The method of claim 1 further comprising:

customer memory circuitry hashing a customer memory hardware-trust code and transferring the customer memory hardware-trust code hash to the hardware-trust controller;

the hardware-trust controller receiving the customer memory hardware-trust code hash from the customer memory circuitry, verifying customer memory hardware-trust based on the customer memory hardware-trust code hash, and in response to the customer memory hardware-trust verification, transferring the trusted execution environment ID, a customer memory ID, customer memory hardware-trust certificate, and customer memory keys to the customer memory circuitry;

the customer edge circuitry transferring the customer edge hardware-trust certificate to the customer memory circuitry, receiving the customer memory hardware-trust certificate from the customer memory circuitry, and verifying the customer memory hardware-trust based on the customer memory hardware-trust certificate and the customer edge keys;

the customer memory circuitry transferring the customer memory hardware-trust certificate to the customer edge circuitry, receiving the customer edge hardware-trust certificate from the customer edge circuitry, and validating the customer edge hardware-trust certificate based on the customer memory keys;

in response to the customer memory hardware-trust verification, the customer edge circuitry encrypting and decrypting a portion of the user data based on the customer edge keys and exchanging the trusted execution environment ID, the customer edge ID, and the portion of the encrypted user data with the customer memory circuitry; and in response to the customer edge hardware-trust verification, the customer memory circuitry encrypting and decrypting the portion of the user data based on the customer memory keys and exchanging the trusted execution environment ID, the customer memory ID, and the portion of the encrypted user data with the customer edge circuitry.

4. The method of claim 3 further comprising:

the customer edge circuitry isolating the user data in the trusted execution environment from other user data in other trusted execution environments;

the customer memory circuitry isolating the user data in the trusted execution environment from the other user data in the other trusted execution environments; and the customer memory circuitry exchanging at least some of the user data with user processors in the trusted execution environment.

5. The method of claim 1 further comprising:

customer app server circuitry hashing a customer app server hardware-trust code and transferring the customer app server hardware-trust code hash to the hardware-trust controller;

the hardware-trust controller receiving the customer app server hardware-trust code hash from the customer app server circuitry, verifying customer app server hardware-trust based on the customer app server hardware-trust code hash, and in response to the customer app server hardware-trust verification, transferring the trusted execution environment ID, a customer app server ID, customer app server hardware-trust certificate, and customer app server keys to the customer app server circuitry;

the customer edge circuitry transferring the customer edge hardware-trust certificate to the customer app server circuitry, receiving the customer app server hardware-trust certificate from the customer app server circuitry, and verifying the customer app server hardware-trust based on the customer app server hardware-trust certificate and the customer edge keys;

the customer app server circuitry transferring the customer app server hardware-trust certificate to the customer edge circuitry, receiving the customer edge hardware-trust certificate from the customer edge circuitry, and verifying the customer edge hardware-trust based on the customer edge hardware-trust certificate and the customer app server keys;

in response to the customer app server hardware-trust verification, the customer edge circuitry encrypting and decrypting a portion of the user data based on the customer edge keys and exchanging the trusted execution environment ID, the customer edge ID, and the portion of the encrypted user data with the customer app server circuitry; and in response to the customer edge hardware-trust verification, the customer app server circuitry encrypting and decrypting the portion of the user data based on the customer app server keys and exchanging the trusted execution environment ID, the customer app server ID, and the portion of the encrypted user data with the customer edge circuitry.

6. The method of claim 5 further comprising:
the customer edge circuitry isolating the user data in the trusted execution environment from other user data in other trusted execution environments;
the customer app server circuitry isolating the user data in the trusted execution environment from the other user data in the other trusted execution environments; and
the customer app server circuitry exchanging at least some of the user data with user processors in the trusted execution environment.

7. The method of claim 1 wherein the provider edge circuitry and the customer edge circuitry comprise multi-protocol label switching communication circuitry.

8. The method of claim 1 wherein the trusted execution environment ID comprises an inter-planetary file system name.

9. The method of claim 1 wherein the provider edge ID comprises an inter-planetary file system name.

10. The method of claim 1 wherein the customer edge ID comprises an inter-planetary file system name.

11. A data communication network to exchange user data across a provider edge and a customer edge based on hardware-trust, the data communication network comprising:
provider edge circuitry configured to hash a provider edge hardware-trust code and transfer the provider edge hardware-trust code hash to a hardware-trust controller;
the hardware-trust controller configured to receive the provider edge hardware-trust code hash from the provider edge circuitry, verify provider edge hardware-trust based on the provider edge hardware-trust code hash, and in response to the provider edge hardware-trust verification, transfer a trusted execution environment Identifier (ID), provider edge ID, provider edge hardware-trust certificate, and provider edge keys to the provider edge circuitry;
customer edge circuitry configured to hash a customer edge hardware-trust code and transfer the customer edge hardware-trust code hash to the hardware-trust controller;
the hardware-trust controller configured to receive the customer edge hardware-trust code hash from the customer edge circuitry, verify customer edge hardware-trust based on the customer edge hardware-trust code hash, and in response to the customer edge hardware-trust verification, transfer the trusted execution environment ID, a customer edge ID, customer edge hardware-trust certificate, and customer edge keys to the customer edge circuitry;
the provider edge circuitry configured to transfer the provider edge hardware-trust certificate to the customer edge circuitry, receive the customer edge hardware-trust certificate from the customer edge circuitry, and verify the customer edge hardware-trust based on the customer edge hardware-trust certificate and the provider edge keys;
the customer edge circuitry configured to transfer the customer edge hardware-trust certificate to the provider edge circuitry, receive the provider edge hardware-trust certificate from the provider edge circuitry, and verify the provider edge hardware-trust based on the provider edge hardware-trust certificate and the customer edge keys;
in response to the customer edge hardware-trust verification, the provider edge circuitry configured to encrypt and decrypt user data based on the provider edge keys and exchange the trusted execution environment ID, the provider edge ID, and the encrypted user data with the customer edge circuitry; and
in response to the provider edge hardware-trust verification, the customer edge circuitry configured to encrypt and decrypt the user data based on the customer edge keys and exchange the trusted execution environment ID, the customer edge ID, and the encrypted user data with the provider edge circuitry.

12. The data communication network of claim 11 further comprising:
the provider edge circuitry configured to isolate the user data in the trusted execution environment from other user data in other trusted execution environments;
the customer edge circuitry configured to isolate the user data in the trusted execution environment from the other user data in the other trusted execution environments; and
the customer edge circuitry configured to exchange at least some of the user data with user processors in the trusted execution environment.

13. The data communication network of claim 11 further comprising:
customer memory circuitry configured to hash a customer memory hardware-trust code and transfer the customer memory hardware-trust code hash to the hardware-trust controller;
the hardware-trust controller configured to receive the customer memory hardware-trust code hash from the customer memory circuitry, verify customer memory hardware-trust based on the customer memory hardware-trust code hash, and in response to the customer memory hardware-trust verification, transfer the trusted execution environment ID, a customer memory ID, customer memory hardware-trust certificate, and customer memory keys to the customer memory circuitry;

the customer edge circuitry configured to transfer the customer edge hardware-trust certificate to the customer memory circuitry, receive the customer memory hardware-trust certificate from the customer memory circuitry, and verify the customer memory hardware-trust based on the customer memory hardware-trust certificate and the customer edge keys;

the customer memory circuitry configured to transfer the customer memory hardware-trust certificate to the customer edge circuitry, receive the customer edge hardware-trust certificate from the customer edge circuitry, and validate the customer edge hardware-trust certificate based on the customer memory keys;

in response to the customer memory hardware-trust verification, the customer edge circuitry configured to encrypt and decrypt a portion of the user data based on the customer edge keys and exchange the trusted execution environment ID, the customer edge ID, and the portion of the encrypted user data with the customer memory circuitry; and in response to the customer edge hardware-trust verification, the customer memory circuitry configured to encrypt and decrypt the portion of the user data based on the customer memory keys and exchange the trusted execution environment ID, the customer memory ID, and the portion of the encrypted user data with the customer edge circuitry.

14. The data communication network of claim 13 further comprising:

the customer edge circuitry configured to isolate the user data in the trusted execution environment from other user data in other trusted execution environments;

the customer memory circuitry configured to isolate the user data in the trusted execution environment from the other user data in the other trusted execution environments; and the customer memory circuitry configured to exchange at least some of the user data with user processors in the trusted execution environment.

15. The data communication network of claim 11 further comprising:

customer app server circuitry configured to hash a customer app server hardware-trust code and transfer the customer app server hardware-trust code hash to the hardware-trust controller;

the hardware-trust controller configured to receive the customer app server hardware-trust code hash from the customer app server circuitry, verify customer app server hardware-trust based on the customer app server hardware-trust code hash, and in response to the customer app server hardware-trust verification, transfer the trusted execution environment ID, a customer app server ID, customer app server hardware-trust certificate, and customer app server keys to the customer app server circuitry;

the customer edge circuitry configured to transfer the customer edge hardware-trust certificate to the customer app server circuitry, receive the customer app server hardware-trust certificate from the customer app server circuitry, and verify the customer app server hardware-trust based on the customer app server hardware-trust certificate and the customer edge keys;

the customer app server circuitry configured to transfer the customer app server hardware-trust certificate to the customer edge circuitry, receive the customer edge hardware-trust certificate from the customer edge circuitry, and verify the customer edge hardware-trust based on the customer edge hardware-trust certificate and the customer app server keys;

in response to the customer app server hardware-trust verification, the customer edge circuitry configured to encrypt and decrypt a portion of the user data based on the customer edge keys and exchange the trusted execution environment ID, the customer edge ID, and the portion of the encrypted user data with the customer app server circuitry; and in response to the customer edge hardware-trust verification, the customer app server circuitry configured to encrypt and decrypt the portion of the user data based on the customer app server keys and exchange the trusted execution environment ID, the customer app server ID, and the portion of the encrypted user data with the customer edge circuitry.

16. The data communication network of claim 15 further comprising:

the customer edge circuitry configured to isolate the user data in the trusted execution environment from other user data in other trusted execution environments;

the customer app server circuitry configured to isolate the user data in the trusted execution environment from the other user data in the other trusted execution environments; and the customer app server circuitry configured to exchange at least some of the user data with user processors in the trusted execution environment.

17. The data communication network of claim 11 wherein the provider edge circuitry and the customer edge circuitry comprise multi-protocol label switching communication circuitry.

18. The data communication network of claim 11 wherein the trusted execution environment ID comprises an inter-planetary file system name.

19. The data communication network of claim 11 wherein the provider edge ID comprises an inter-planetary file system name.

20. The data communication network of claim 11 wherein the customer edge ID comprises an inter-planetary file system name.

* * * * *